US006264369B1

(12) United States Patent
Mesing et al.

(10) Patent No.: US 6,264,369 B1
(45) Date of Patent: Jul. 24, 2001

(54) VARIABLE VANE SEAL AND WASHER MATERIALS

(75) Inventors: Thomas C. Mesing, Loveland; Wayne R. Bowen; David B. Hester, both of West Chester, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/239,639

(22) Filed: Jan. 29, 1999

(51) Int. Cl.$^{7}$ ..................................................... F16C 33/18

(52) U.S. Cl. ............................................ 384/300; 908/911

(58) Field of Search .................................... 384/300, 299, 384/298, 909, 908, 911

(56) References Cited

U.S. PATENT DOCUMENTS 3,303,992 2/1967 Johnson .
3,909,087 * 9/1975 Cairns ................................. 308/238
4,111,499 * 9/1978 McCloskey ............................ 308/72
4,123,122 * 10/1978 Gabrielson et al. ................. 308/238
4,394,467 * 7/1983 Edelman .......................... 428/367 X
4,703,076 * 10/1987 Mori .................................... 524/420
4,767,656 * 8/1988 Chee et al. .......................... 428/116
4,983,240 * 1/1991 Orkin et al. ..................... 156/148 X
5,039,277 8/1991 Naudet .
5,219,232 * 6/1993 Adams et al. ....................... 384/275
5,281,087 1/1994 Hines .
5,300,366 * 4/1994 Nakamuru et al. .................. 428/549
5,308,226 5/1994 Venkatasubbu et al. .
5,364,682 * 11/1994 Tanaka et al. ....................... 428/138
5,593,275 1/1997 Venkatasubbu et al. .
5,622,434 * 4/1997 Takahashi .............................. 384/49
5,622,473 4/1997 Payling .
5,646,076 * 7/1997 Bortz ............................... 428/300 X
5,695,197 * 12/1997 Farley et al. ..................... 525/200 X
5,807,072 9/1998 Payling .

FOREIGN PATENT DOCUMENTS

307112 * 3/1989 (EP) .
60-141743 * 7/1985 (JP) .

* cited by examiner

*Primary Examiner*—Sherry Estremsky
(74) *Attorney, Agent, or Firm*—Andrew C. Hess; Nathan D. Herkamp

(57) ABSTRACT

A multi-layer seal and washer that provide a seal between a vane stem and a casing in a turbine engine are disclosed. The seal and washer are fabricated from materials such as Teflon fibers and glass fibers and are impregnated with a polyimide resin. The seal and washer are durable and have a low coefficient of friction.

10 Claims, 2 Drawing Sheets

VARIABLE VANE SEAL AND WASHER MATERIALS

BACKGROUND OF THE INVENTION

This invention relates generally to bearing assemblies and, more particularly, to bearing assembly materials.

Gas turbine engines generally include a high pressure compressor, a combustor, and a high pressure turbine. Compressed air flows through the engine while fuel is mixed with the compressed air and ignited to form a high energy gas steam in the high pressure compressor and combustor, respectively. The high pressure compressor, combustor, and high pressure turbine are sometimes collectively referred to as a core engine. Such gas turbine engines also may include a low pressure compressor for supplying compressed air, for further compression, to the high pressure compressor, and a fan for supplying air to the low pressure compressor.

The high pressure compressor typically includes a rotor surrounded by a casing. The casing is typically fabricated to be removable, such as by forming the casing into two halves that are then removably joined together. The high pressure compressor includes a plurality of stages and each stage includes a row of rotor blades and a row of stator vanes. The casing supports the stator vanes, and the rotor supports the rotor blades. The stator vane rows are between the rotor blade rows and direct air flow toward a downstream rotor blade row.

Variable stator vane assemblies are utilized to control the amount of air flowing through the compressor to optimize performance of the compressor. Each variable stator vane assembly includes a variable stator vane which extends between adjacent rotor blades. The variable stator vane is rotatable about an axis. The orientation of the variable stator vane affects air flow through the compressor.

A known variable vane assembly includes a variable vane, a trunnion seal, and a washer. The variable vane assembly is bolted onto a high pressure compressor stator casing and the trunnion seal and washer surround an opening that extends through the casing. The variable vane includes a vane stem that extends through the opening in casing and through the trunnion seal and washer. The seal and washer are referred to herein as a bearing assembly. The bearing assembly produces a low friction surface that prevents metal on metal contact. Such variable vane assemblies have possible air leakage pathways through the openings in the casing. Also, the high velocity and high temperature air causes oxidation and erosion of the bearing assemblies, which may lead to failure of fibers within the bearing assembly, and eventual failure of the variable vane assembly.

Once the bearing assembly fails, an increase in leakage through the opening occurs, which results in a performance loss. In addition, failure of the bearing assembly allows contact between the stator vane and the casing, which causes wear and increases overhaul costs of the engine.

Accordingly, it would be desirable to provide bearing assemblies fabricated from materials having performance characteristics that will reduce or eliminate air leakage between the stator vane stem and the compressor casing. In addition, it would be desirable to provide an increase in the durability of the seal and washer composition to increase part life.

BRIEF SUMMARY OF THE INVENTION

These and other objects may be attained by a multi-layer bearing assembly that provides a seal between a vane stem and a casing. In one embodiment, the bearing assembly includes a washer and a seal positioned on the casing to surround an opening. The vane stem extends through the opening and the bearing assembly. Outer layers of each element in the bearing assembly are fabricated from a combination of materials that provide a low coefficient of friction.

The seal prevents the stator vane from contacting the stator casing and prevents air flow from exiting the opening. The washer prevents contact between spacer and the casing and also prevents air flow from exiting the opening. The bearing assembly thus provides two barriers to air flow escaping through the opening in the stator casing.

The seal and washer are fabricated from a combination of materials, such as Teflon fibers and glass fibers impregnated with a polyimide resin, that have desirable performance characteristics and that provide a low coefficient of friction. In addition, the bearing assembly materials significantly improve the service life of the stator vane assembly and reduce air leakage through the opening in the stator casing. Further, the bearing assembly provides an efficiency improvement in the turbine engine while reducing overhaul costs caused by metal on metal contact between the stator casing, the stator vane, and the spacer.

DETAILED DESCRIPTION OF THE INVENTION

Figure 1:
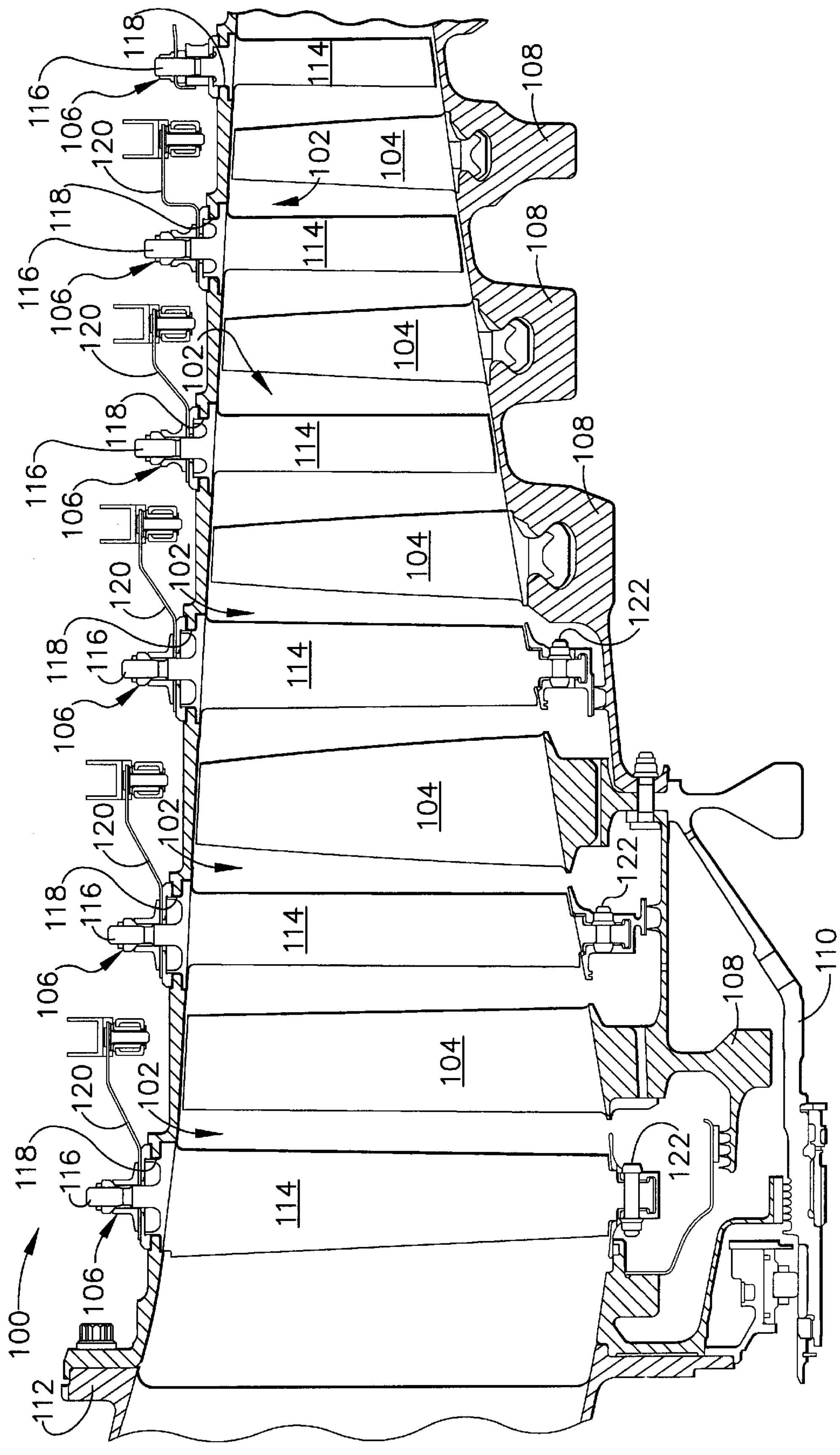
FIG. 1 (PRIOR ART)
FIG. 1 is a schematic view of a portion of a high pressure compressor for a turbine engine.

FIG. 1 is a schematic view of a section of a high pressure compressor 100 for a turbine engine (not shown). Compressor 100 includes a plurality of stages 102, and each stage 102 includes a row of rotor blades 104 and a row of variable stator vane assemblies 106. Rotor blades 104 are typically supported by rotor disks 108, and are connected to a rotor shaft 110. Rotor shaft 110 is a high pressure shaft that is also connected to a high pressure turbine (not shown). Rotor shaft 110 is surrounded by a stator casing 112 that supports variable stator vane assemblies 106.

Each variable stator vane assembly 106 includes a variable vane 114 and a vane stem 116. Vane stem 116 protrudes through an opening 118 in casing 112. Variable vane assemblies 106 further include a lever arm 120 extending from variable vane 114 that is utilized to rotate variable vanes 114. The orientation of vanes 114 relative to the flow path through compressor 100 controls air flow therethrough. Some variable vane assemblies 106 are secured to casing 112 by bolts 122.

Variable vane assemblies 106 control air flow through compressor 100. However, variable vane assemblies 106 also provide a potential pathway for air flow to exit compressor 100, such as through openings 118. The loss of air flow through openings 118 reduces the efficiency of compressor 100.

Figure 2:
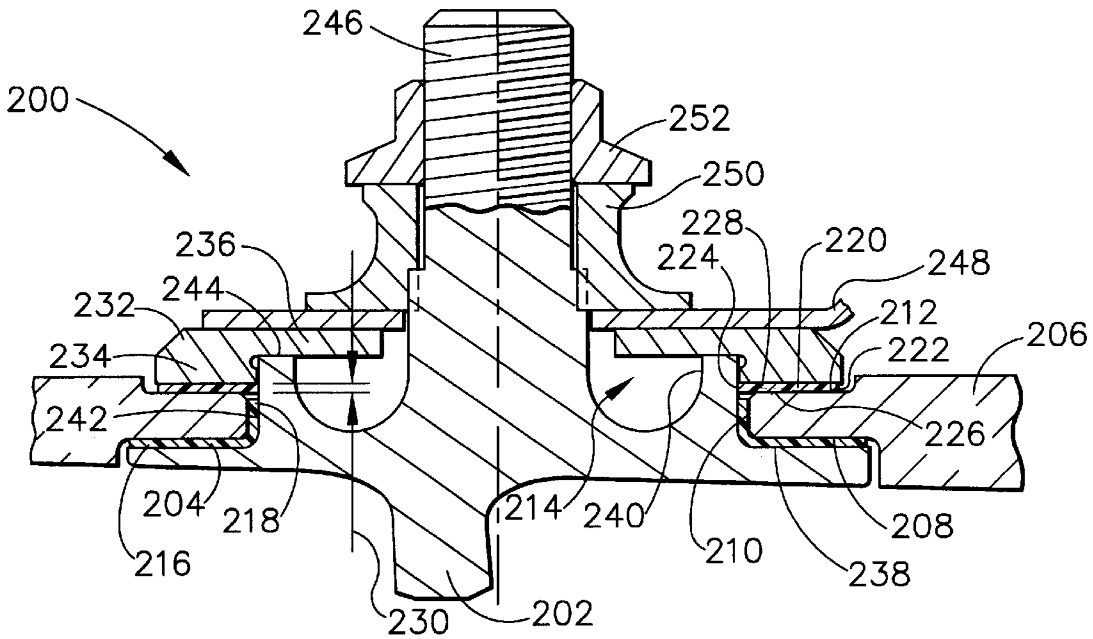
FIG. 2 is a cross-sectional view of a variable vane assembly including a bearing assembly according to one embodiment of the present invention.

FIG. 2 is a schematic view of a variable vane assembly 200 according to one embodiment of the present invention. Variable vane assembly 200 includes a variable vane 202. A seal 204 is positioned on variable vane 202. A casing 206 supports variable vane 202 and includes a first recessed portion 208, an inner portion 210, and a second recessed portion 212. An opening 214 is formed by inner portion 210.

Seal 204 includes a first portion 216 and a second portion 218. Seal first portion 216 is in direct contact with casing first recessed portion 208 and separates variable vane 202 from casing 206. Seal second portion 218 contacts casing inner portion 210 and separates variable vane 202 from casing 206. In one embodiment, seal first portion 216 extends substantially an entire length of casing first recessed portion 208. In addition, seal second portion 218 extends substantially an entire length of casing second recessed portion 212 and is substantially perpendicular to seal first portion 216. Seal 204 prevents variable vane 202 from directly contacting casing 206.

Variable vane assembly 200 further includes a washer 220. In one embodiment, washer 220 is substantially flat and includes an inner diameter surface 222 and an outer diameter surface 224. More specifically, washer 220 includes a first wall 226, a second wall 228, and a thickness 230 that is substantially constant from inner diameter surface 222 to outer diameter surface 224. Washer 220 is in direct contact with casing second recessed portion 212 and extends substantially an entire length of casing second recessed portion 212.

Variable vane assembly 200 includes a spacer 232 in contact with washer 220. Washer 220 prevents contact between spacer 232 and casing second recessed portion 212. Spacer 232 includes a first portion 234 and a second portion 236. Spacer first portion 234 contacts washer 220 and has a length substantially equal to a radial length of washer 220. Spacer 232 is separated from seal 204 by washer 220. In one embodiment, seal 204 and washer 220 do not contact each other. Washer 220 prevents spacer 232 from contacting casing 206.

Variable vane 202 also includes a first portion 238, a ledge 240 having an outer portion 242, and a spacer seating portion 244. Ledge 240 surrounds a vane stem 246. Vane stem 246 and ledge 240 extend through opening 214 in casing 206. Seal second portion 218 extends along inner portion 210 of casing 206. Seal second portion 218 prevents ledge outer portion 242 from contacting casing inner portion 210.

Variable vane assembly 200 also includes a lever arm 248 positioned around vane stem 246 and contacting spacer 232. Lever arm 248 is utilized to adjust the angle of variable vane 202, anrd thus alter the flow of air through the compressor.

In addition, variable vane assembly 200 includes a sleeve 250 contacting lever arm 248, and a lever arm nut 252 contacting sleeve 250. Lever arm nut 252 cooperates with vane stem 246 and maintains variable vane assembly 200 in contact with casing 206.

Variable vane assembly 200 is assembled by placing seal 204 on variable vane 202 such that first portion 216 and second portion 218 contact variable vane 202 and are substantially perpendicular. Variable vane 202 and seal 204 extend through opening 214.

Washer 220 is placed on casing 206 adjacent seal 204. Spacer 232 is positioned on variable vane 202 and contacts washer 220. Lever arm 238 is positioned over vane stem 246 and contacts spacer 232. Sleeve 250 is positioned over vane stem 246 and contacts lever arm 248. Finally, lever arm nut 252 is positioned over vane stem 246 and contacts sleeve 250.

Washer 220 and seal 204 form a bearing assembly used in variable vane assembly 200 and may be used, for example, in a high pressure compressor. Of course, washer 220 and seal 204 may be utilized in other environments such as a rotor vane assembly, a low pressure compressor variable vane assembly, a high pressure turbine, or a low pressure turbine.

Figure 3:
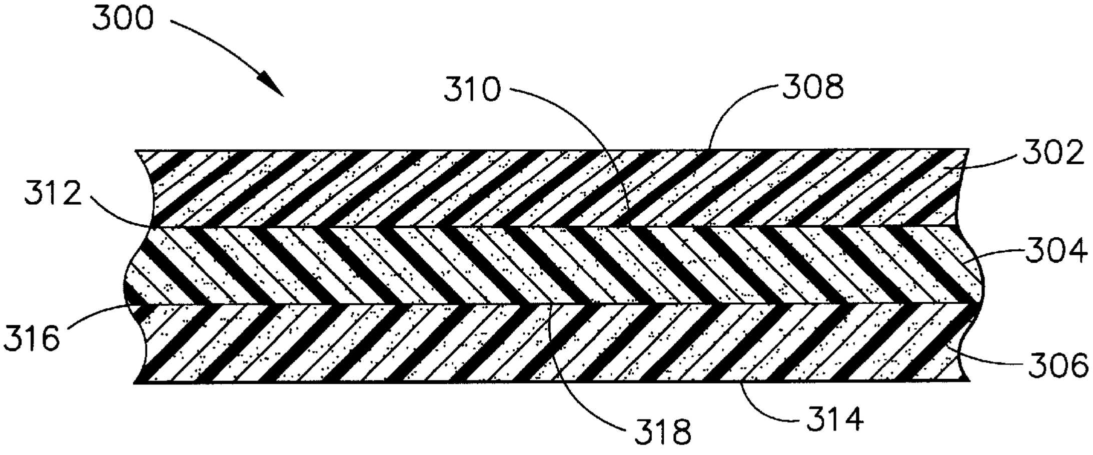
FIG. 3 is a cross-sectional view of layers of the bearing components shown in FIG. 2.

FIG. 3 is a cross-sectional view of a bearing element 300. Bearing element 300 may be utilized, for example, in a variable vane assembly, such as variable vane assembly 200, (shown in FIG. 2), as washer 220 and/or seal 204. Of course, bearing element 300 may be used in any bearing assembly where it is desirable to have durability and a low coefficient of friction.

Bearing element 300 includes a first layer 302, a second layer 304, and a third layer 306. Second layer 304 includes a first side 308 and a second side 310. First layer 302 includes an interior surface 312 and an exterior surface 314. Similarly, third layer 306 includes an interior surface 316 and an exterior surface 318.

First layer 302 and third layer 306 are fabricated from Teflon fibers and glass fibers woven into the form of a mat. Second layer 304 is fabricated from glass fibers which are also woven into the form of a mat. The Teflon and glass fibers utilized in the fabrication of first layer 302 and third layer 306 are woven such that exterior surfaces 314 and 318 include mostly Teflon fibers while interior surfaces 312 and 316 include mostly glass fibers. The Teflon fibers on exterior surfaces 314 and 318 enhance the low coefficient of friction of bearing component 300 and the glass fibers on interior surfaces 312 and 316 allow for better adhesion of first layer 302 and third layer 306 to second layer 304. Alternatively, layers 302, 304, and 306 may be braided with first layer 302 and third layer 306 fabricated from Teflon fibers and carbon fibers, and second layer 304 fabricated from carbon fibers.

First layer 302, second layer 304, and third layer 306 are impregnated with a polyimide resin suitable for enhancing durability and lowering the coefficient of friction of bearing element 300. Suitable polyimide resins include NR-150, commercially available from E.I. duPont de Nemours and Company, Wilmington, Del., MVK-19, commercially available from Maverick Corporation, Cincinnati, Ohio, Xylan 1010, commercially available from Whitford Corporation, West Chester, Pa., Skybond-703, commercially available from I.S.T. America, Chula Vista, Calif., and PMR-15, commercially available from Cytec Industries, Inc., West Paterson, N.J.

To form bearing element 300, a polyimide resin is impregnated into first layer 302, second layer 304, and third layer 306 and then cured. First layer 310, second layer 312, and third layer 314 are placed in contact with each other and are then bonded together to form bearing component 300.

Additionally, Teflon powder may be added to the polyimide resin to provide increased durability and lower the coefficient of friction for bearing component 300. A final coating of the polyimide resin containing Teflon powder, $MoS_2$ particles, or combinations thereof may also be utilized to further enhance the durability and lower the coefficient of friction of bearing component 300. Alternatively, first layer 302, second layer 304, and third layer 306 may be plasma etched prior to being impregnated with the polyimide resin to enhance bonding of the resin to bearing component 300.

The glass fibers utilized to form first layer 302, second layer 304, and third layer 306 are typically coated with a sizing material, such as an epoxy. The sizing material may be replaced with other suitable materials, such as silane. Alternatively, the glass fibers utilized to form first layer 310, second layer 312, and third layer 314 may be replaced with quartz fibers.

The bearing assembly significantly restricts airflow through the stator casing, thus leading to a longer and improved service life for the variable vane assembly. Since air leaks are reduced or prevented through the opening, the turbine engine has an increased efficiency. Further, the overhaul costs of the turbine engine in general, and specifically the compressor, will be reduced since contact between the casing, the variable vane, and the spacer is substantially reduced, or eliminated.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A bearing element comprising:

a plurality of layers, a first of said layers formed from a plurality of materials comprising at least one of Teflon fibers, glass fibers, carbon fibers, and combinations thereof, a second of said layers formed from a single material; and at least one polyimide resin impregnating said layers.

2. A bearing element in accordance with claim 1 wherein said glass fibers are coated with a sizing material comprising at least one of an epoxy coating, a silane coating, and combinations thereof.

3. A bearing element in accordance with claim 2 wherein each said layer comprises a woven mat of said plurality of material fibers.

4. A bearing element in accordance with claim 2 wherein each said layer comprises a braided mat of said plurality of material fibers.

5. A bearing element in accordance with claim 2 wherein said plurality of layers are plasma etched.

6. A bearing element in accordance with claim 2 wherein said sizing material further comprises Teflon powder.

7. A bearing element in accordance with claim 1 wherein said at least one polyimide resin further comprises Teflon powder.

8. A bearing element in accordance with claim 1 further comprising a coating including a polyimide resin comprising at least one of a Teflon powder, $MoS_2$ particles, and combinations thereof.

9. A bearing element in accordance with claim 1 wherein said plurality of layers further comprises a first layer comprising a woven mat of Teflon fibers and glass fibers, a second layer comprising a woven mat of glass fibers, and a third layer comprising a woven mat of Teflon fibers and glass fibers.

10. A bearing element in accordance with claim 1 wherein said bearing element comprises at least one of a washer and a seal.

* * * * *